United States Patent
Fenton-Jones

(10) Patent No.: US 7,398,267 B2
(45) Date of Patent: Jul. 8, 2008

(54) INFORMATION SYSTEM

(75) Inventor: Simon Fenton-Jones, Avalon (AU)

(73) Assignee: Catalyst On Line Solutions Pty Limited, New South Wales (AU)

(*) Notice: Subject to any disclaimer, the term of this patent is extended or adjusted under 35 U.S.C. 154(b) by 415 days.

(21) Appl. No.: 10/881,069

(22) Filed: Jun. 29, 2004

(65) Prior Publication Data

US 2005/0033597 A1    Feb. 10, 2005

(30) Foreign Application Priority Data

Jun. 30, 2003    (AU) ............................... 2003903309

(51) Int. Cl.
*G06F 17/30* (2006.01)

(52) U.S. Cl. .............................. 707/3; 707/10; 707/102; 715/758; 715/759; 709/203

(58) Field of Classification Search ................. 707/100, 707/104.1, 2–5, 9, 10, 102; 715/234, 758, 715/759, 771, 773, 760, 778; 709/203
See application file for complete search history.

(56) References Cited

U.S. PATENT DOCUMENTS

| | | | |
|---|---|---|---|
| 6,981,021 B2 * | 12/2005 | Takakura et al. | 709/204 |
| 2005/0038717 A1 * | 2/2005 | McQueen et al. | 705/27 |
| 2006/0230061 A1 * | 10/2006 | Sample et al. | 707/103 R |

* cited by examiner

*Primary Examiner*—Cheryl Lewis
(74) *Attorney, Agent, or Firm*—Morrison & Foerster LLP

(57) ABSTRACT

This invention concerns virtual rooms for communicating information about specific topics. The virtual room comprises an identification code to identify the address of each virtual room, and a web site to enable communication between users of a virtual room and to receive and publish information relating to the specific topic. The identification code includes a telephonic prefix and a telephonic subscriber number the later which corresponds to a subject category in a bibliographic classification convention. The virtual room further comprises a data repository to store information relating to the specific topic including communication between users of the virtual room. The data repository is organised according to learning objects and users search an index of the bibliographic classification convention to locate a virtual room related to a specific topic. The invention further concerns an information system for sharing information.

30 Claims, 1 Drawing Sheet

INFORMATION SYSTEM

FIELD OF INVENTION

This invention concerns virtual rooms for communicating information about specific topics. In another aspect, the invention concerns an information system for sharing information.

BACKGROUND OF THE INVENTION

Users searching for specific pieces of information or knowledge may begin by accessing the World Wide Web to take advantage of the wealth of information that is available online. Typically, information on the Internet is discovered by using a search engine, for example, http://www.google.com. This requires the user to enter key words into the search engine. Search engines return a list of web pages that contain key words or Metadata descriptors abiding by conventions such as Dublin Core. Key words on their own are without context, however by entering more key words, a list of web sites may be massaged into a rough context. Some key words entered by users may return data sets that lead them away from useful information. Inexperienced or parochial users are usually unaware of culturally appropriate key words such as acronyms, abbreviations or project names. Researchers must continually inspect the contents of very large data sets returned from search engines in order to attempt to discover a datum's relevance and/or significance to their interest, enquiry or project.

Generally, most users obtain a pressing piece of information by calling telephone help lines. A typical scenario is that a user dials, connects and then responds to an Interactive Voice Response (IVR) unit to navigate through a menu until they are directed to a content manager in an appropriate area. Increasingly, they are directed to general web sites to begin their enquiry again or to specific web pages to read a script or learn about an application.

Frequently, users are bounced from operator to operator and web site to web site. This is done in a vain attempt to have users understand the limitations of products and services that are perceived by them as being useful in achieving their group's private goals and their community's social ends.

Although human operators are trained to help users in a special technical or product area, they rarely possess an understanding of their department's or agency's context in relation to organised operations or the knowledge to resolve or direct a customer's enquiry. Reciprocally, no media structure or form of education exists that could assist operators to answer, in an ordered way, the same Frequently Asked Questions from different enquirers at the one time.

SUMMARY OF THE INVENTION

In a first aspect, the invention is a virtual room for communicating information about a specific topic, the virtual room comprising:

an identification code to identify the address of the virtual room, the identification code including a telephonic prefix and a telephonic subscriber number, the telephonic subscriber number corresponding to a subject category in a bibliographic classification convention;

a web site to enable communication between users of the virtual room, and to receive and publish information relating to the specific topic; and a data repository to store information relating to the specific topic including communication between users of the virtual room, the data repository being organised according to learning objects;

where, users search an index of the bibliographic classification convention to locate a virtual room related to a specific topic.

The bibliographic classification convention may be published bibliographic indexes familiar to librarians, such as, but not limited to, the Dewey Decimal Classification or the Library of Congress Classification. Therefore, the bibliographic classification convention may be relative or hierarchical. Advantageously, the skill, experience and conventions of librarians in such examples is leveraged to assist users in locating relevant information in a virtual room of a specific topic. Users may be librarians.

The telephonic prefix may be four digits, for example, but not limited to, 1800 or 1300. The telephonic subscriber number may be six digits. The first three digits of the telephonic subscriber number may be general numbers of the Dewey Decimal Classification. The last three digits of the telephonic subscriber number may be a corporate classification or a special classification. The last three digits of the telephonic subscriber number may correspond to detailed assessments from a general virtual room. The last three digits of the telephonic subscriber number may indicate the competency of users participating in a virtual room, for example, beginner, intermediate or advanced.

The web site may include at least one of a message board, a discussion list, automated polling, file sharing and a chat facility. Users may communicate via audio and/or video conference. The web site may provide a diary describing upcoming events to be held in a particular virtual room. An event may be an online presentation from an offline event.

A learning object may include at least one of a list of Frequently Asked Questions (FAQ), a diary entry, minutes of meetings, a synopsis of an abstract or strategy, a recording of a programme or a presentation, results of a poll, results of a vote, and a live or pre-recorded teleconference. The teleconference may be an audio and/or video conference.

Frequently Asked Questions may be ranked according to the number of times each question is asked by users. A Frequently Asked Question may be answered by a subject specialist at a predetermined time.

In one example, a user asks a question relating to a specific topic to a librarian. The librarian locates the virtual room relating to the specific topic and directs the user to the room and/or publishes the question into the list of Frequently Asked Questions (FAQ) on the user's behalf, if the user's question has not been previously answered. Advantageously, if the user's question is one which is frequently asked, it is highly likely that an answer is already published. Otherwise, the user can wait for the question to be answered and in the meantime browse other learning objects within the room.

The virtual room may further comprise an automated back-up facility to archive information communicated in the virtual room.

The virtual room may be accessible via the Internet or telephone. Audio components of the virtual room may be accessed via an Interactive Voice Response (IVR) unit, speech recognition unit or telephone keypad to cater for people with disabilities.

The virtual room may be used as a nexus between call centres.

Advantageously, in accordance with at least one example, the virtual room provides product specialists with a place to learn about how related products complement or integrate with each other. Another advantage of at least one example is that virtual rooms allow busy help desk operators to set aside a period of time and find a place where complex questions can be directed, addressed or answered in full or clarified in greater detail.

Examples of the present invention offer a media structure that allow seemingly unrelated inquiries to identify common elements, patterns and ends. They also provide a new context for conventions that support the discovery of knowledge in libraries and on the telephone.

In a second aspect, the invention is an information system for sharing information, the system comprising:

a collection of virtual rooms for communicating information about specific topics, each virtual room including:

an identification code to identify the address of the virtual room, the identification code including a telephonic prefix and a telephonic subscriber number, the telephonic subscriber number corresponding to a subject category in a bibliographic classification convention;

a web site to enable communication between users of the virtual room, and to receive and publish information relating to the specific topic; and a data repository to store information relating to the specific topic including communication between users of the virtual room, the data repository being organised according to learning objects; and a directory service to enable users to locate a virtual room of a specific topic by searching an index of the bibliographic classification convention;

where, pre-determined virtual rooms are interlinked to allow users to navigate between virtual rooms such that more than one pathway is available for the user to reach a virtual room related to a specific topic.

Virtual rooms may be interlinked according to the classification conventions. The specific topic may be found in the hierarchical classification. Virtual rooms may be interlinked if they are in unrelated contexts or the specific topics are similar.

The information system may further comprise a market surveying tool to monitor the number of users participating in a virtual room.

Advantageously, at least one example of the present invention provides an intuitive directory model to both web researchers and telephone callers. Psychologically, virtual rooms provide a place for isolated groups or committees to talk or type, where they can ask a question and poll the opinion of inside and outside audiences, record proceedings or leave objects. Their classification according to their room number, provides an easily comprehensible way for users to discover new contextual relationships and monitor their change.

Advantageously, at least one example of the present invention offers librarians and help desk operators an extension of their professional practice. The present invention provides new forms of media for education where emphasis is placed on levels of learning outside the boundaries of age, position, discipline, profession, or any other disability.

Examples of the present invention address the primary limitation of search engines in their inability to search, outside an existing intranet network, by a continuum. Most search tools are only capable of handling divisions of: alphabet, for example, The White Pages and dictionaries; category, for example, The Yellow Pages and professional journals; time, for example, news and magazine pages; and location, for example, atlases and street maps. These four divisions are incapable of systematically introducing relevant information at a time, which may innovate between these conventional divisions of practical knowledge.

BRIEF DESCRIPTION OF THE DRAWINGS

An example of the invention will now be described with reference to the accompanying drawings, in which.

DETAILED DESCRIPTION OF THE DRAWINGS

Figure 1:
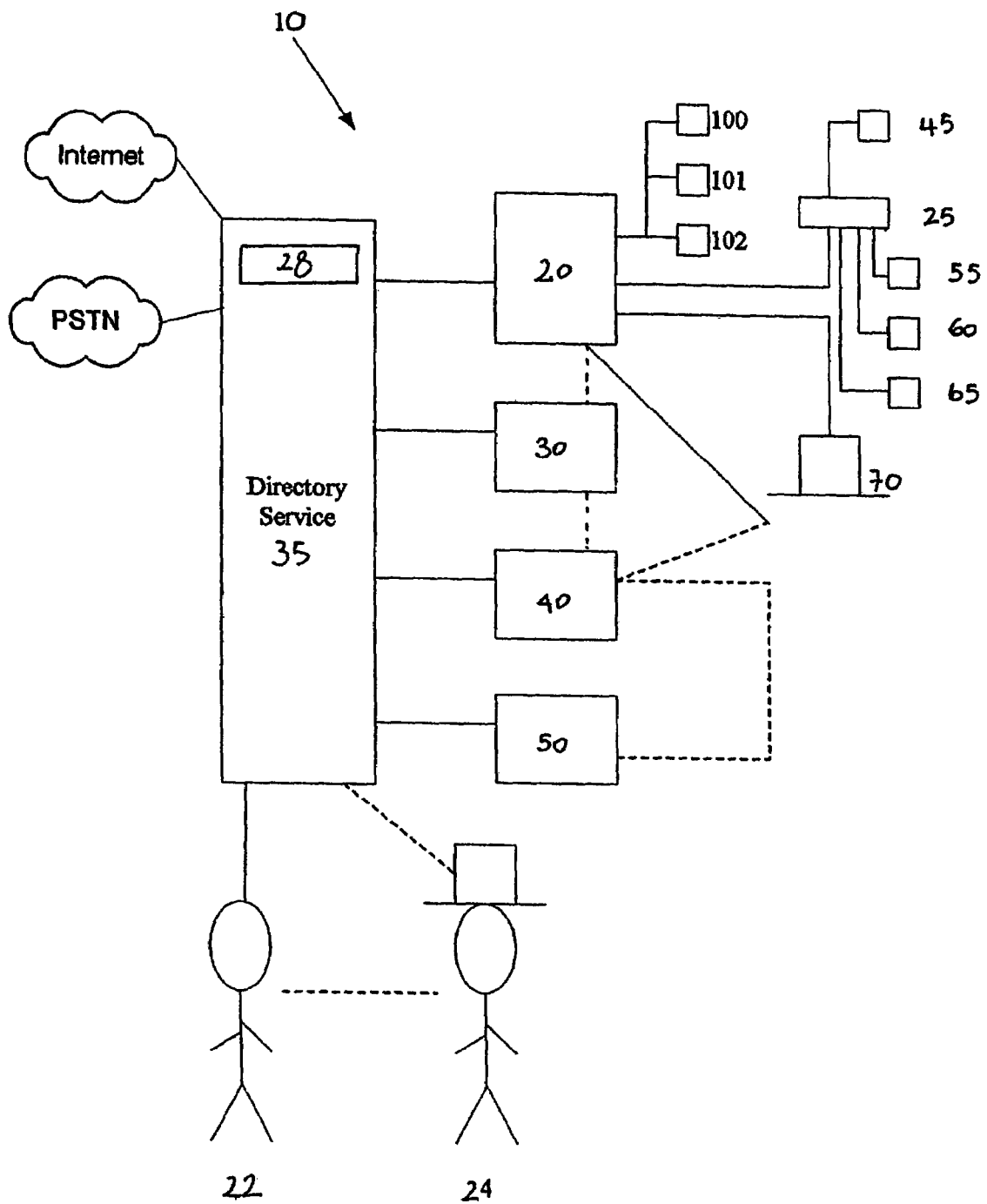
FIG. 1 is a block diagram of an information system in accordance with an embodiment of the invention.

Referring to FIG. 1, an information system 10 for sharing information, comprises a collection of virtual classrooms 20, 30, 40, 50 where audio and video conferences occur, are edited and recorded in various media and data formats. Identification codes 28 are used to identify each virtual room. Each virtual room includes a web site 25 to enable communication between users 22 of the virtual room 20 about a specific topic and a data repository 70 to store information about the specific topic. Virtual rooms 20, 30, 40, and 50, are interlinked using hypertext links so that users 22 can navigate from one virtual room to another. This creates different pathways for users 22 to reach a topic they are interested in.

The identification codes 28 are in the form a telephonic prefix and a telephonic subscriber number combination for classification of a specific topic. All identification codes are stored in a directory called the Dewtel Directory, 35 which is searched by a user 22 initially to locate a virtual room 20. The telephonic prefix corresponds to a classification of telephone numbers, for example, '13', '18', '1800' or '1300', and applies nationally. The telephonic subscriber number is a subject category number in the published Dewey Decimal Classification, a commonly used bibliographic classification convention to classify books. The telephonic subscriber number is six digits, the first three being called general numbers and the last three being called corporate or special numbers. Examples of general room numbers are: '101.000', '102.000', '103.000' etc. General numbers are not permanently fixed but their conventions have been internationally accepted over the last one hundred years. Different publishers and libraries allocate different subject matter to a general number depending on usage. Some will use up to twelve digit corporate or special numbers depending on what they are trying to achieve. The Dewtel Directory 35 takes these factors into account when generating and listing the identification codes 28 of virtual rooms 20, 30, 40 and 50.

The depth and breadth of subject matter included in the Dewtel Directory 35 can constantly evolve by firstly adding new corporate or special rooms, '100', '101', '102' identified by their room number '000.xxx', as discussions hosted in general rooms 'xxx.000' become more detailed and specific. Alternatively, groups of corporate users may find it more convenient to promote their portion of their more detailed or specific discussions to a general room 'xxx.000'. Examples of corporate room numbers relating to a general room '101.xxx' are: '101.001', '101.002', '102.003' etc.

The system 10 responds to new user demands simply by introducing new members or deleting old numbers. New room numbers are inserted or old ones deleted on demand without changing another room's organisational context. Alternatively, a Dewtel manager 24 can delete noise or inactivity by directing users 22 to different rooms. The different rooms can be more interesting or the manager 24 can direct the users 22 to the same room but at different times.

As an example, '020' is a classification used in the Dewey Decimal Classification for general discussion and media about library relationships. In the Dewtel Directory 35, '1800 020 000' is the identification code The room 20 which the identification code addresses is used to receive enquiries from users 22 interested in finding out about the quality of librarians. Interested users 22 can read their latest issues and direct their questions to its subject specialist 24, who can open the room for an hour per week to answer new Frequently Asked Questions (FAQs). Over time, general enquiries into library relationships eventually cover more specific topics. When this happens, a Dewtel manager 24 allocates time and rooms for enquiries based around National, State and Local library relationship issues. These rooms are identified by codes '1800 020 001', '1800 020 002' and '1800 020 003' respectively. Adding rooms is an intuitive way to allocate and find more specific information.

The allocation of room numbers to room managers is wholly at the discretion of the organisation's Dewtel manager or subject specialist 24. Depending on demand, other room numbers could be allocated for related subjects. For example, rooms '1800 020 004', '1800 020 005'and '1800 020 006' can be allocated to subject matters which are of great interest to National, State and Local webmaster relationships. Each of the rooms allows access and accepts responses from users 22 with various degrees of access and contribution rights.

The web site 25 of a virtual room enables users 22 to communicate with each other using a visual chat facility 45 or IP-phone connection 55. The web site 25 includes an online diary 60 to inform users 22 of upcoming events and activities in a particular virtual room 20 and a recording facility 65. For users 22 with disabilities, the diary 60 is accessible by touchtone phone or speech recognition mechanism. The web site 25 also includes an electronic bulletin board to receive and send information and questions related to specific topics. Questions are discussed, reviewed, minuted and their answers and related "viewing times" published on the web site 25. FAQs are aggregated and answered on a most asked basis. Material is periodically and automatically archived to a data repository 70.

The data repository 70 for each virtual room stores learning objects related to the particular room 20 and links to common elements of different rooms 30, 40, 50. This includes communication between users 22 generated in the virtual room from the use of telephones 55, message boards, discussion lists or chat facilities 45. The data repository 70 archives multimedia and accepts links to and from other fixed learning objects in other archives. The data repository 70 accepts data from virtual rooms' web caches and archives material in general categories on a programmed basis. The data repository 70 provides links to and from multimedia elements of fixed learning objects in other archives. For example, minutes of meetings, recordings of programmes or presentations are learning objects that can be edited to provide a snapshot or overview of a number of rooms 20, 30, 40 and 50. For example, one common element might be a frequently mentioned TV broadcast or radio interview, which can reside in another archive. Links can be traded between archives knowing their learning object's relationship will not change.

The data repository 70 presents users 22 with general interests the capability to browse related inquiries and more conveniently discover and trace the common elements. The loose aggregation of rooms by an accepted convention provides social groups with a new way of gaining a broader understanding of different facts, concepts, contexts, timing, perspectives, and different approaches to learning. Virtual rooms 20, 30, 40 and 50 offer geographically isolated groups with a simplified way of discovering people with similar interests and level of learning and communicating and compiling educational media.

The following examples describe how the information system 10 can be applied to existing social circumstances.

EXAMPLE 1

Government Agency

In Australia, there are three levels of government each of which have an agency that must try to deal with the same citizen. This includes answering that citizen's questions and providing the citizen with specific information in an efficient manner. In short, all of the agencies must make an attempt at a civil education. This form of education has traditionally reduced to comprise individual awareness raising programmes where a citizen is treated like a consumer such that they learn small things, in a small context. It is common for these programmes to appear without warning and disappear without a trace.

One adverse effect of these transcendental programmes is that a citizen is left feeling confused. It is impossible to trace the threads of development in a large number of projects and programmes that are implemented usually at different times by each tier of government agency. One outcome of this effect has been to create, at the higher levels of governance, bureaucracies capable only of building policy and allocating resources. These bureaucracies are excluded from the implementation of managerial decisions and therefore incapable of learning about the limitations and mistakes caused by a clash or misinterpretation of policies. Lower levels of governance on the other hand are typically over regulated and left with a lack of understanding of the overall "big picture".

Meanwhile parliamentary inquiries remain immune from using new media technologies whilst a lot of money is allocated by their agencies to the development of content.

Using the information system 10, project managers with similarly defined outcomes are able to share a virtual room. The effects of sharing a virtual room are that separate strategies for projects are traceable. This means that the strategies are clearly understood and can adapt to complement others over time. Furthermore new operational relationships are encouraged through an information structure which supports cross learning. Learning periods are able to be coordinated on a timelier and more comprehensive basis. Finally as the repository serves as a memory for governmental strategies and their developing projects, the repository becomes a learning resource for citizens of all ages.

EXAMPLE 2

A Telecommunications Company

Many modern organisations are built around the idea of specialisation of function. They are derived from an industrial model whereby they must allocate their labours into divisions that are responsible for delivering particular products or set of services at a time agreed to by a user 22.

Telecommunications companies illustrate the events driving the change in reasoning behind organised behaviour. Many devices such as fax machines, mobile phones, personal digital assistants (PDA's) and computers now complicate the provisioning of a network for fixed line, mobile telephones or Internet services. Many forms of media, from voice mail to email to web pages to cable programmes, fill the telecommunications channels and can saturate a user 22.

Traditionally telecommunication companies employ help desk operators who are trained to provide advice on one or two products or small group of services. They are required to answer questions from users 22 who have varying degrees of understanding about technical issues. Call centres tend to be built as a "one size fits all" training centre. The result is that questions from callers are often answered via a script. Systemised feedback is rare and pre-product design with customers and/or other product teams is scarce.

To address this problem, the Dewtel Directory 35 classifies virtual rooms 20, 30, 40 and 50 for beginner, intermediate or advanced users so that users might find one more amenable to their level of learning. Each of the rooms are classified by any librarian or Dewtel Manager 24 to hold information and to host conversations about similar products, projects or research. FAQ's can represent the basis of all market research or product development rather than to represent questions that have been continually answered in isolation.

EXAMPLE 3

Small Customers

Small customers (SME and residential) 22 of technology such as sole traders attempt to construct new combinations of products if they are to extract some advantage from a plethora of new applications. As they attempt to understand the many combinations of products and services, users 22 must commit large amounts of time in learning how things might best be arranged. Call centres can only explain the features and benefits of an offering through a salesperson. Often the only other help is via a technician who may only be capable of answering a lot of very specific questions about developments and some very general ones that can be considered as research. Users 22 typically are ignored and left to spend hours reading information from a web site or referred endlessly onwards from operator to operator.

Virtual rooms 20, 30, 40 and 50 are used as an information nexus for separate call centres or as a meeting place for users 22 with the same questions. They provide a place for product specialists and advanced users to learn about how products relate, complement one other, or integrate. Virtual rooms allow busy help desk operators to set time aside and find a place where more complex questions can be directed, addressed and either answered in full or clarified in greater detail. A room 20 allows help desk operators to direct similar queries without wasting the time of a team leader. It offers information managers a way to allocate and identify the compilers of answers for FAQ's. By doing so, an organisation learns how users 22 are using different products and what they value most. Rooms 20, 30, 40 and 50 provide a place to store and clarify related FAQs. They provide an efficient means to direct the people asking them.

In this example, the structure of the Dewtel Directory 35 can provide a new way for isolated people or complementary groups to discover others with similar interests and to learn from each other. At the same time, the flexible structure of virtual rooms offers isolated specialists a way to promote their ideas or explain their strategies and concepts at a time that is relevant to potentially complementary groups.

Virtual rooms 20, 30, 30, 40 and 50 enable remote groups to assemble and distribute audio/visual programmes quickly. After a presentation, recorded programmes are left in situ to accumulate with other learning objects. At a convenient time, this can contribute to a broader understanding about a subject. The times in a room are owned by any group in an organisation. The structure of a virtual room offers an organisation the means to manage, develop and store their employees' knowledge outside the usual organisational divisions. In this example, the rooms are owned by committees or communities enquiring into specific ends.

The Dewtel Directory 35 also provides national contexts for all public discussions, from parliamentary committees to the most specialised of groups. Opportunities for cross group learning are increased if room managers classify rooms and direct users on a subject/predicate basis. For example, if a user 22 is searching for 'computing for seniors' they can be directed to '1800 374 000' for Adult Education or '1800 615 005' for Computing technologies.

Users 22 are directed towards their preferred choice of two media pathways to information, either via telephone number or via a web site. At the same time users 22 intuitively understand that more immediate communication or more relevant information is near to hand. The present invention provides a media structure where a telephone enquirer will realise and appreciate that information can be presented on a number of levels.

In this embodiment, a virtual room in its most basic form comprises a web site 25 which publishes a list of FAQs relating to a specific topic as it's only learning object and receives questions relating to the specific topic from users 22. The room has a data repository 70 for storing the FAQs. The room 20 is a place where the public can go and interact, by asking questions relating to the specific topic of the room 20, and wait for a subject specialist to answer the questions. Librarians 24 use their knowledge and experience of the Dewey Decimal Classification to direct users 22 quickly and intuitively to a room about their specific topic. Users 22, with or without the assistance of librarians 24, can also search the relative index of the Dewey Decimal Classification, to find the room relevant to their specific topic.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A computer-implemented virtual room for communicating information about a specific topic, the virtual room comprising:

computer software configured to utilize an identification code to identify the address of the virtual room, the identification code including a telephonic prefix and a telephonic subscriber number, the telephonic subscriber number corresponding to a subject category in a bibliographic classification convention;

a computer-implemented web site to enable communication between users of the virtual room, and to receive and publish information relating to the specific topic; and a computer-implemented data repository to store information relating to the specific topic including communication between users of the virtual room, the data repository being organised according to learning objects;

where the software is configured such that users search an index of the bibliographic classification convention to locate a virtual room related to a specific topic, and users search an index of the telephonic prefix, the concatenation of a selected telephonic prefix and a selected bibliographic classification convention providing an address for interlinking the virtual room to an associated virtual room.

2. The virtual room according to claim 1, where the bibliographic classification convention is a published bibliographic index.

3. The virtual room according to claim 2, where the bibliographic classification convention is one of relative and hierarchical.

4. The virtual room according to claim 1, where a first group of digits of the telephonic subscriber number are general numbers of the bibliographic classification convention.

5. The virtual room according to claim 4, where a second group of digits of the telephonic subscriber number correspond to one of a corporate classification and a special classification.

6. The virtual room according to claim 4, where a second group of digits of the telephonic subscriber number correspond to detailed assessments from a general virtual room.

7. The virtual room according to claim 4, where a second group of digits of the telephonic subscriber number are indicative of the competency of a user participating in a virtual room.

8. The virtual room according to claim 1, where the web site comprises at least one of a message board, a discussion list, an automated polling, file sharing and a chat facility.

9. The virtual room according to claim 1, where the web site further comprises a diary describing upcoming events to be held in the virtual room.

10. The virtual room according to claim 1, where the learning object includes at least one of a list of Frequently Asked Questions (FAQ), a diary entry, minutes of a meeting, a synopsis of an abstract or a strategy, a recording of a programme and a presentation, a poll, a vote, a live teleconference and a pre-recorded teleconference.

11. The virtual room according to claim 1, where the learning object is a list of FAQ's, the FAQ's being ranked according to the number of times each question has been asked by users.

12. The virtual room according to claim 11, where a FAQ is answerable by a subject specialist at a predetermined time.

13. The virtual room according to claim 1, where the virtual room further comprises an automated back-up facility to archive information communicated in the virtual room.

14. The virtual room according to claim 1, where the virtual room is accessible via any one of the world wide web and a telephone.

15. The virtual room according to claim 1, where the virtual room is operable as a nexus between at least two call centres.

16. The virtual room according to claim 1, where communication between users occurs via teleconference facilities.

17. The virtual room according claim 16, where communication between users occurs at least via audio conference and audio components of the virtual room are accessible via at least one of an Interactive Voice Response (IVR) unit, a speech recognition unit and telephone keypad to cater for users with disabilities.

18. An information system for sharing information, the system comprising:
    a collection of computer-implemented virtual rooms for communicating information about specific topics, each virtual room including:
    computer software configured to utilize an identification code to identify the address of the virtual room, the identification code including a telephonic prefix and a telephonic subscriber number, the telephonic subscriber number corresponding to a subject category in a bibliographic classification convention;
    a computer-implemented web site to enable communication between users of the virtual room, and to receive and publish information relating to the specific topic; and
    a computer-implemented data repository to store information relating to the specific topic including communication between users of the virtual room, the data repository being organised according to learning objects; and
    a computer-implemented directory service to enable users to locate a virtual room of a specific topic by searching an index of the bibliographic classification convention the directory service further enabling users to search an index of the telephonic prefix, the concatenation of a selected telephonic prefix and a selected bibliographic classification convention providing an address for interlinking the virtual room to an associated virtual room;
    where, the software is configured such that pre-determined virtual rooms are interlinked to allow users to navigate between virtual rooms such that more than one pathway is available for the user to reach a virtual room which relates to a specific topic.

19. The information system according to claim 18, where the virtual rooms are interlinked according to a hierarchical classification.

20. The information system according to claim 18, where the information system further comprises a market survey tool to monitor the number of users participating in a virtual room.

21. The information system according to claim 18, where the bibliographic classification convention is a published bibliographic index.

22. The information system according to claim 21, where a first group of digits of the telephonic subscriber number are general numbers of the Dewey Decimal classification convention.

23. The information system according to claim 22, where a second group of digits of the telephonic subscriber number correspond to any one of a corporate classification and a special classification.

24. The information system according to claim 22, where a second group of digits of the telephonic subscriber number correspond to detailed assessments from a general virtual room.

25. The information system according to claim 22, where a second group of digits of the telephonic subscriber number are indicative of the competency of a user participating in a virtual room.

26. The information system according to claim 18, where the web site comprises at least one of a message board, a discussion list, an automated polling, file sharing and a chat facility.

27. The information system according to claim 18, where the learning object includes at least one of a list of Frequently Asked Questions (FAQ), a diary entry, minutes of a meeting, a synopsis of an abstract or a strategy, a recording of a programme or a presentation, a poll, a vote, and a live or pre-recorded teleconference.

28. The information system according to claim 27, where the learning object is a list of FAQ's, the FAQ's being ranked according to the number of times each question has been asked by users.

29. The information system according to claim 28, where a FAQ is answerable by a subject specialist at a predetermined time.

30. The information system according to claim 18, further comprising an automated back-up facility to archive information communicated in the virtual room.

* * * * *